United States Patent
Wang

(10) Patent No.: US 8,093,854 B2
(45) Date of Patent: Jan. 10, 2012

(54) FAN SPEED CONTROL SYSTEM

(75) Inventor: Fei Wang, Henan (CN)

(73) Assignee: NVIDIA Corporation, Santa Clara, CA (US)

( * ) Notice: Subject to any disclaimer, the term of this patent is extended or adjusted under 35 U.S.C. 154(b) by 670 days.

(21) Appl. No.: 12/246,209

(22) Filed: Oct. 6, 2008

(65) Prior Publication Data
US 2010/0033120 A1    Feb. 11, 2010

(30) Foreign Application Priority Data
Aug. 6, 2008   (CN) .......................... 2008 1 0146112

(51) Int. Cl.
*G05B 11/28*    (2006.01)
(52) U.S. Cl. ......... 318/599; 318/799; 318/811; 388/811
(58) Field of Classification Search ............. 318/400.01, 318/599, 779, 799, 811; 388/811, 829, 934; 324/76.29
See application file for complete search history.

(56) References Cited

U.S. PATENT DOCUMENTS

| | | | | |
|---|---|---|---|---|
| 6,650,074 B1 * | 11/2003 | Vyssotski et al. | ....... | 318/400.12 |
| 7,164,249 B2 * | 1/2007 | Wu et al. | ................. | 318/400.03 |
| 7,224,137 B2 * | 5/2007 | Chiu et al. | .................... | 318/376 |
| 7,248,005 B2 * | 7/2007 | Makaran | ........................ | 318/66 |
| 7,479,753 B1 * | 1/2009 | Mimberg | ..................... | 318/599 |
| 7,545,112 B2 * | 6/2009 | Wu et al. | ....................... | 318/592 |
| 7,580,617 B2 * | 8/2009 | Yabe | ............................. | 388/811 |
| 7,598,690 B2 * | 10/2009 | Yang et al. | ................. | 318/254.1 |
| 7,702,223 B2 * | 4/2010 | Qian et al. | ..................... | 388/825 |
| 7,742,688 B2 * | 6/2010 | Zou et al. | ..................... | 388/811 |
| 7,772,902 B2 * | 8/2010 | Chiu et al. | .................... | 327/172 |

* cited by examiner

*Primary Examiner* — Walter Benson
*Assistant Examiner* — Antony M Paul
(74) *Attorney, Agent, or Firm* — Patterson & Sheridan, LLP

(57) ABSTRACT

A system for controlling the fan speed is described. Specifically, one embodiment of the present invention set forth a computing system, which includes a first processing unit including a first sensor, wherein the first processing unit is configured to generate a first pulse-width modulation signal, and a first transmission line further including a first direct current voltage converter configured to convert the first pulse-width modulation signal to a first direct current voltage and a first diode coupled to the first direct current voltage converter, wherein the first diode determines whether the first direct current voltage passes through the first diode. The computing system further includes an amplifier coupled to the first diode, wherein the amplifier is configured to amplify a selected direct current voltage to drive a fan.

10 Claims, 3 Drawing Sheets

FAN SPEED CONTROL SYSTEM

CROSS-REFERENCE TO RELATED APPLICATIONS

This application claims the benefit of People's Republic of China Application No. 200810146112.2, filed on Aug. 6, 2008 and having.

BACKGROUND OF THE INVENTION

1. Field of the Invention

Embodiments of the present invention relate generally to a fan speed control system and more specifically to a system for controlling fan speed in a computing system that includes multiple components capable of dissipating heat.

2. Description of the Related Art

Unless otherwise indicated herein, the approaches described in this section are not prior art to the claims in this application and are not admitted to be prior art by inclusion in this section.

A computing system typically has a processing unit to process data. In order to improve the computing speed of a computing system, one approach is to integrate multiple processing units into a computing system. However, a processing unit consumes power and releases heat when it operates. This heat dissipation problem worsens if the computing system includes multiple processing units. Therefore, incorporating a cooling system in the computing system to take the released heat out of the computing system is essential to prevent the components in the computing system from malfunctioning or even burning down due to overheating.

A cooling system may include a fan. A fan typically generates noises and consumes power. If the speed of the fan cannot be adjusted and simply operates at full speed all the time, then the fan tends to make undesirable levels of noises and consume unnecessary amount of power. In addition, the life of such fan may be shortened.

FIG. 1 illustrates a conventional computing system 100 including three graphic processing units (GPUs), a first GPU 110, a second GPU 120 and a third GPU 130, that dissipate different levels of heat. The first GPU 110, the second GPU 120, and the third GPU 130 are associated with a first pulse-width modulation (PWM) signal 112, a second PWM signal 122, and a third PWM signal 132, respectively. A multi-channel fan controller IC 140 controls the operating speed of a fan 150 according to the respective PWM signal associated with each GPU.

The multi-channel fan controller IC 140 passes a specific PWM signal associated with a particular GPU dissipating the highest level of heat among the first GPU 110, the second GPU 120 and the third GPU 130. The fan 150 receives the specific PWM signal and adjusts its speed accordingly. In FIG. 1, the fan 150 is capable of interpreting a PWM signal passed through the multi-channel fan controller IC 140 directly. However, such fan capable of interpreting a PWM signal directly and the multi-channel fan controller IC are not a cost effective solution to a low cost computer system.

To further reduce cost, another conventional system avoids using a multi-channel fan controller IC and a fan capable of interpreting a PWM signal and instead uses a DC voltage controlled fan. FIG. 2 illustrates a computing system 200 including one GPU 210 and a DC voltage controlled fan 250. The GPU 210 dissipates heat and associates with a PWM signal 212. The PWM signal 212 is transferred to a DC voltage $V_{214}$ at a node 214 by a resistance 220 and a capacitor 230, therefore, the DC voltage $V_{214}$ is associated with the PWM signal 212. When the PWM signal 212 changes because of the operation of the GPU 210, the DC voltage $V_{214}$ is changed accordingly. The DC voltage $V_{214}$ is then amplified by an amplifier 240 with a fixed amplified ratio to generate an amplified voltage $V_{216}$ at a node 216 which is strong enough to drive a fan 250.

In FIG. 2, the speed of the fan 250 is directly controlled by the amplified voltage 216, rather than the PWM signal 212. This type of fan is typically called as a DC voltage controlled fan and cheaper than the fan capable of interpreting a PWM signal directly. However, lacking of a component capable of selecting a highest voltage among different voltage sources, such as the multi-channel fan controller IC 140 illustrated in the FIG. 1, a DC voltage controlled fan and its control circuits cannot be used in a computing system including multiple processing units because the control circuits cannot control the speed of the fan 250 for a specific processing unit dissipating the highest level of heat among all processing units.

As the foregoing illustrates, what is needed is a system for controlling fan speed in a computing system that includes multiple processing units and addressing at least the problems set forth above.

SUMMARY OF THE INVENTION

A system for controlling the fan speed is described. Specifically, one embodiment of the present invention set forth a computing system, which includes a first processing unit including a first sensor, wherein the first processing unit is configured to generate a first pulse-width modulation signal, and a first transmission line further including a first direct current voltage converter configured to convert the first pulse-width modulation signal to a first direct current voltage and a first diode coupled to the first direct current voltage converter, wherein the first diode determines whether the first direct current voltage passes through the first diode. The computing system further includes an amplifier coupled to the first diode, wherein the amplifier is configured to amplify a selected direct current voltage to drive a fan.

At least one advantage of the present invention disclosed herein is using a diode to determine whether a direct current voltage passes through the diode. By setting each diode on every transmission line between every respective processing unit in a computing system and the only fan in the computing system, only the diode on the transmission line coupled to the processing unit with the highest temperature is turned on and the speed of fan is associated with the processing unit with the highest temperature.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "electrical network" broadly refers to an interconnection of electrical elements, such as resistors, inductors, capacitors, transmission lines, voltage sources, current sources, switches, diodes and amplifiers. The term "direct current voltage converter" broadly refers to an electrical circuit configured to convert a pulse-width modulation signal to a stable direct current voltage. The term "duty cycle" broadly refers to a function of time that a component is in an active state or a proportion of time during which a component is operated. The term "transmission line" broadly refers to a material medium or structure that forms all or part of a path from one place to another for directing the transmission of energy, such as electromagnetic waves or acoustic waves, as well as electric power transmission.

In accordance with an embodiment of the invention, a computing system includes multiple processing units, a fan, and respective transmission lines coupled each processing unit to the fan. Each processing unit includes a sensor configured to detect the respective operating temperature of the processing units. Each processing units generates a pulse-width modulation signal associated with the operating temperature of each processing unit, respectively. Each pulse-width modulation signal has its own duty cycle. Each transmission line includes a direct current voltage converter configured to covert the pulse-width modulation signal to a stable direct current voltage. Each transmission line further includes a diode configured to determine whether the converted stable direct current voltage passes through the diode.

Figure 1:
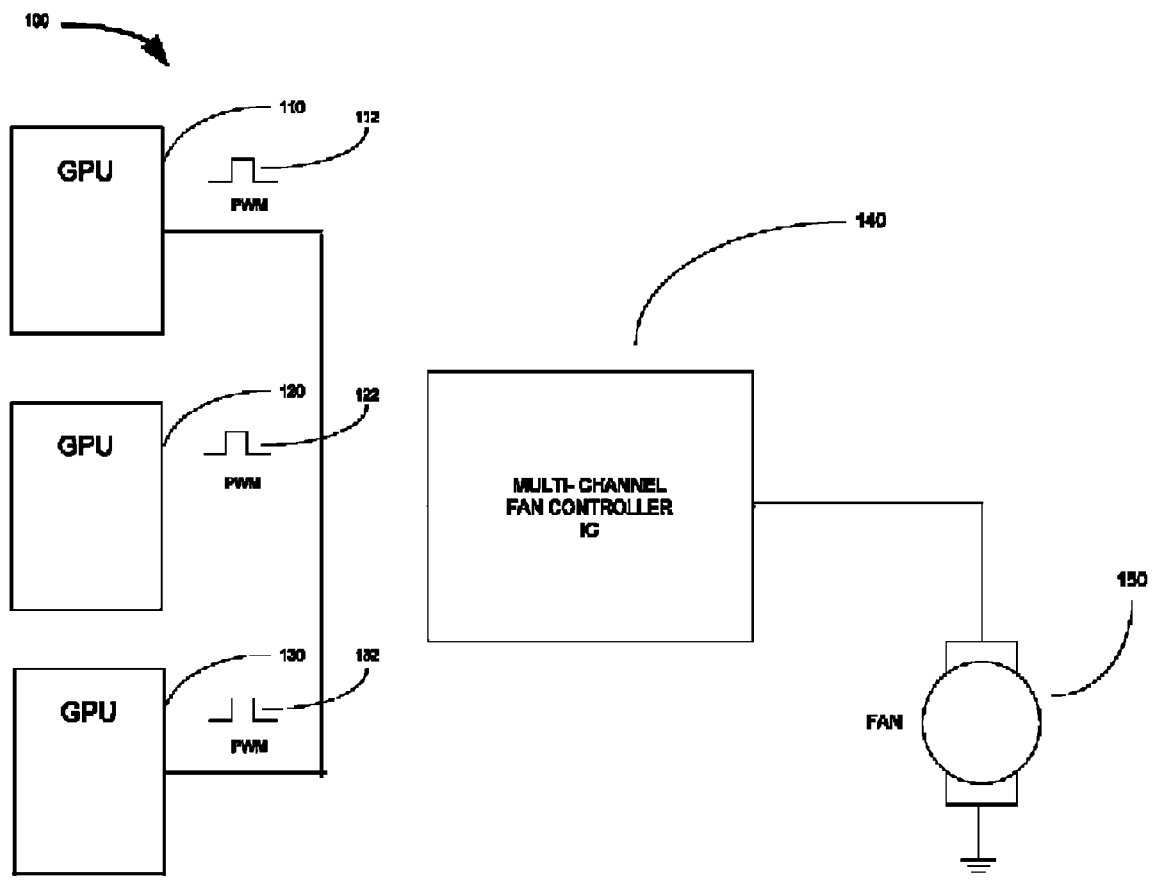
FIG. 1 is a block diagram of a conventional computing system including multiple processing units, a fan and a multi-channel fan controller IC configured to control the speed of fan.
Figure 2:
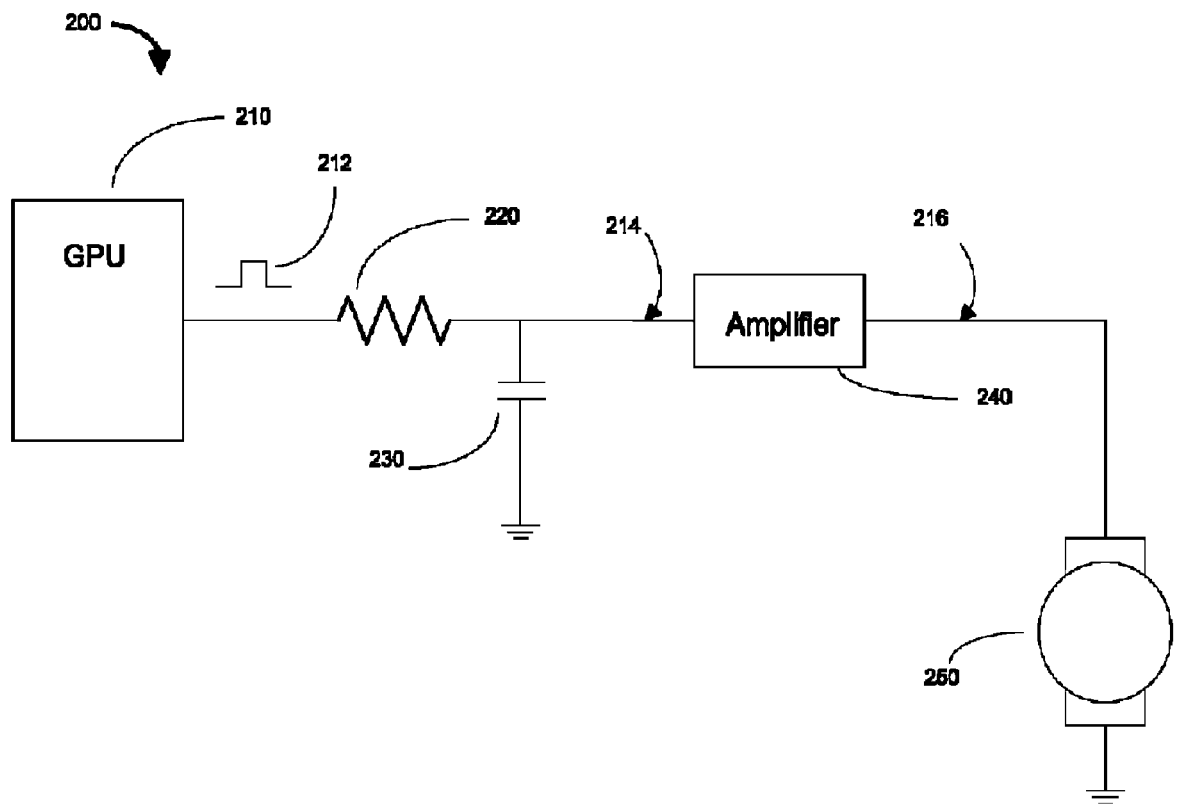
FIG. 2 is a circuit diagram of a conventional computing system including a processing unit, a fan configured to be controlled by a DC voltage converted from a PWM signal generated by a sensor of the processing unit.
Figure 3:
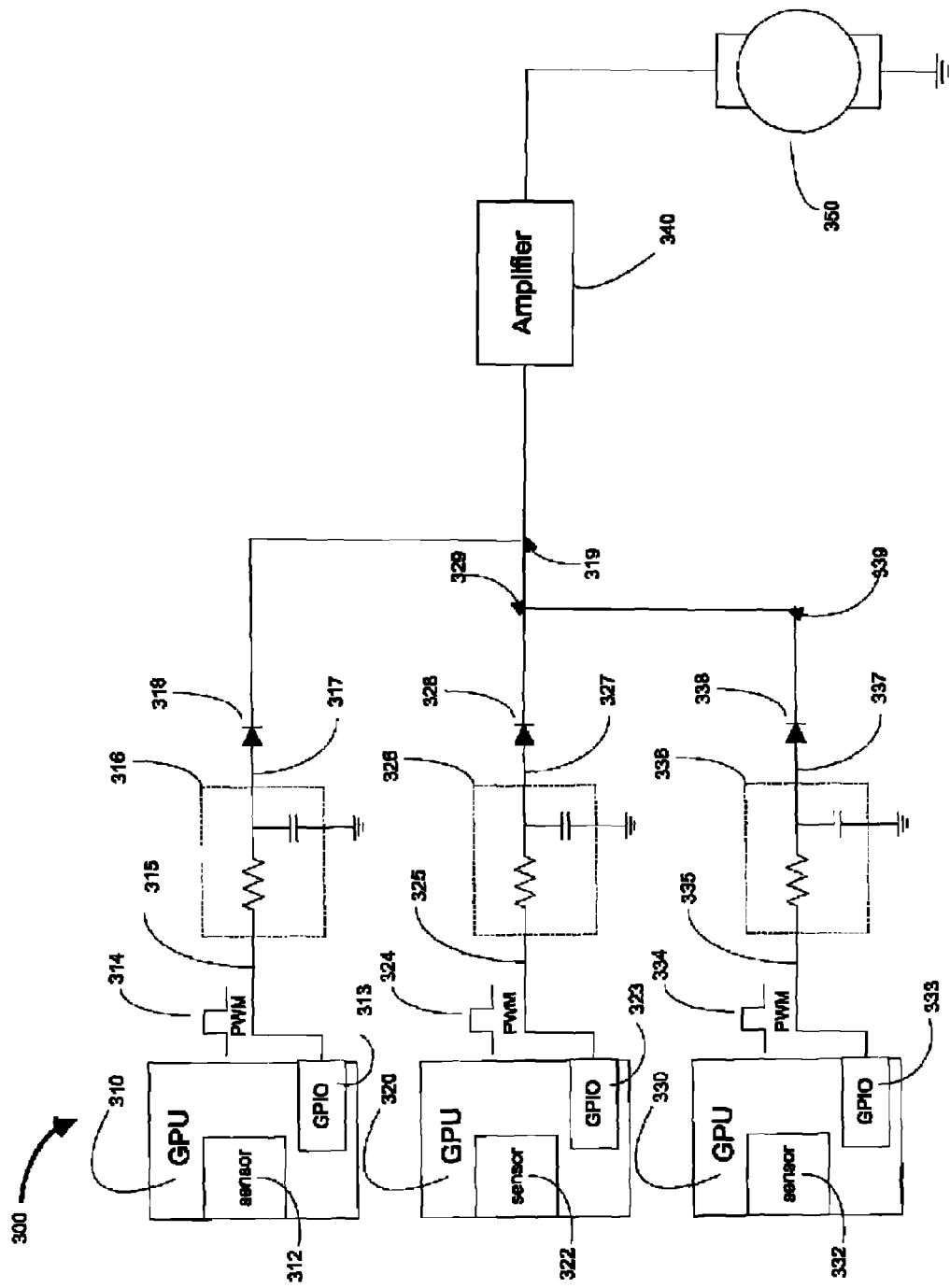
FIG. 3 is a block diagram of a computing system including multiple processing units and a fan, according to one embodiment of the invention.

FIG. 3 is a block diagram of a computing system 300 including multiple processing units and a fan, according to one embodiment of the invention. In one implementation, the computing system 300 includes three graphic processing units (GPUs), a GPU 310, a GPU 320, and a GPU 330. The GPU 310 includes a sensor 312 and a general purpose I/O (GPIO) 313.

The GPU 310 generates a pulse-width modulation signal 314 in response to an operating temperature of the GPU 310 measured by the sensor 312. The pulse-width modulation signal 314 is then delivered to a transmission line 315 through the GPIO 313.

Similarly, the GPU 320 includes a sensor 322 and a GPIO 323. The GPU 320 generates a pulse-width modulation signal 324 in response to an operating temperature of the GPU 320 measured by the sensor 322, and sends the pulse-width modulation signal 324 to a transmission line 325 through the GPIO 323. The GPU 330 also includes a sensor 332 and a GPIO 333. The GPU 330 generates a pulse-width modulation signal 334 in response to an operating temperature of the GPU 330 measured by the sensor 332, and sends the pulse-width modulation signal 334 to a transmission line 335 through the GIPO 333.

If the GPU 310, the GPU 320 and the GPU 330 are configured to process different data, then the corresponding work loads differ from each other. As a result, the GPU 310, the GPU 320 and the GPU 330 dissipate different levels of heat and operate at different temperatures. As the pulse-width modulation signals 314, 324, and 334 are associated with the operating temperatures of the GPUs 310, 320, and 330 measured by the sensors 312, 322, and 332, respectively, the pulse-width modulation signals 314, 324, and 334 differ from each other.

The pulse-width modulation signal 314 then passes through a direct current voltage converter 316 and is converted to a stable direct current voltage $V_{317}$ at a node 317 on the transmission line 315. The direct current voltage converter may be a capacitor-resistor circuit 316. When a pulse-width modulated signal is in the high state, it charges the capacitor via the resistor. When the pulse-width modulated signal is in the low state, it discharges the capacitor. Therefore, the direct current voltage converter is charged and discharged periodically and thus outputs a substantially constant direct current voltage. Similarly, the pulse-width modulation signal 324 and the pulse-width modulation signal 334 are converted to stable direct current voltages $V_{327}$ at a node 327 and $V_{337}$ at a node 337 through direct current voltage converters 326 and 336, respectively.

A diode is a two-terminal device. Diodes have two active electrodes, one is cathode and the other is anode, between which the current may flow. Diodes exhibit a unidirectional current property and are usually used for the rectifying property as they only allow an electric current to pass in one direction and block it in the opposite direction. In a diode, when the voltage applied on the anode is greater than the voltage applied on the cathode, the diode is turned on and the electric current flows through the diode from the anode to the cathode. On the other hand, when the voltage applied on the anode is less than the voltage applied on the cathode, the diode is turned off and the electric current does not flow through the diode from the anode to the cathode.

There are various types of diodes, such as Zener diode, Schottky diode, Tunnel diode, light-emitting diode, photodiode, and p-n diode. As an illustration, in a p-n diode, the p-type region is anode and the n-type region is cathode. When the voltage applied on the p-type region is greater than the voltage applied on the n-type region, the p-n diode is turned on and the electric current flows through the diode from the p-type region (anode) to the n-type region (cathode). On the other hand, when the voltage applied on the p-type region is less than the voltage applied on the n-type region, the p-n diode is turned off and the electric current does not flow through the diode from the p-type region (anode) to the n-type region (cathode).

Referring back to FIG. 3, when the GPU 310, the GPU 320, and the GPU 330 operate at different temperatures, the direct current voltages $V_{317}$ at the node 317, $V_{327}$ at the node 327 and $V_{337}$ at the node 337 are different. For illustration, in one implementation, the pulse-width modulation signal 314 has a 30% duty cycle, the pulse-width modulation signal 324 has a 50% duty cycle and the pulse-width modulation signal 334 has a 70% duty cycle. The GPU 310, the GPU 320, the GPU 330 are the same model and a pulse-width modulation signal with a 100% duty cycle generated by such model of the GPU is converted to a direct current voltage of 3.3 volts after passing through the direct current voltage converter. Therefore, the voltage $V_{317}$ at the node 317 is about 1 volt, the voltage $V_{327}$ at the node 327 is about 1.65 volts and the voltage $V_{337}$ at the node 337 is about 2.3 volts.

In such implementation, when the diodes 318, 328 and 338 have the same voltage drop, such as 0.25 volt, then the voltage at node 339 is about 2.05 volts ($V_{339}$). The diode 338 is turned on because the voltage applied at the node 337 ($V_{337}$) is greater than the voltage applied at the node 339 ($V_{339}$).

The voltages at the node 329 ($V_{329}$) and the node 319 ($V_{319}$) are the same with the voltage at the node 339 ($V_{339}$), therefore, $V_{329}$ is greater than $V_{327}$ and $V_{319}$ is greater than $V_{317}$. In the implementation, the diodes 318 and 328 are not turned on because the voltages applied at the nodes 317 and 327 are less than voltages applied at nodes 319 and 329, respectively. Therefore, only the direct current voltage $V_{337}$ is sent to an amplifier 340 to drive a fan 350. As such, the speed of the fan 350 is controlled by the direct current voltage $V_{337}$ associated with the pulse-width modulation signal 334 having the highest duty cycle among the duty cycles of the pulse-width modulation signals generated by the GPUs in the computing system. Following the same principle, this system also works in a computing system with a minimum of two processing units or even more than three processing units.

While the forgoing is directed to embodiments of the present invention, other and further embodiments of the invention may be devised without departing from the basic scope thereof. Therefore, the above examples, embodiments, and drawings should not be deemed to be the only embodiments, and are presented to illustrate the flexibility and advantages of the present invention as defined by the following claims.

I claim:

1. An electrical network for controlling fan speed, comprising:
    a first electrical network that includes:
        a first direct current voltage converter configured to convert a first pulse-width modulation signal to a first direct current voltage, and
        a first diode coupled to the first direct current voltage converter, wherein the first diode determines whether the first direct current voltage passes through the first diode;
    a second electrical network that includes that includes:
        a second direct current voltage converter configured to convert a second pulse-width modulation signal to a second direct current voltage, and
        a second diode coupled to the second direct current voltage converter, wherein the second diode determines whether the second direct current voltage passes through the second diode; and
    an amplifier coupled to the first diode and the second diode, wherein the amplifier is configured to amplify the greater of the first direct current voltage and the second direct current voltage to drive a fan.

2. The electrical network of claim 1, wherein the first direct current voltage passes through the first diode if the first direct current voltage is greater than the second direct current voltage.

3. The electrical network of claim 1, wherein the second direct current voltage passes through the second diode if the second direct current voltage is greater than the first direct current voltage.

4. The electrical network of claim 1, wherein a first voltage drop developed across the first diode is the same as a second voltage drop developed across the second diode.

5. The electrical network of claim 1, wherein the first direct current voltage converter and the second direct current voltage converter are resistor-capacitor circuits.

6. A computing system, comprising:
    a first processing unit including a first sensor, wherein the first processing unit is configured to generate a first pulse-width modulation signal;
    a first electrical network that includes:
        a first direct current voltage converter configured to convert the first pulse-width modulation signal to a first direct current voltage, and
        a first diode coupled to the first direct current voltage converter, wherein the first diode determines whether the first direct current voltage passes through the first diode;
    a second processing unit including a second sensor, wherein the second processing unit is configured to generate a second pulse-width modulation signal;
    a second electrical network that includes:
        a second direct current voltage converter configured to convert the second pulse-width modulation signal to a second direct current voltage, and
        a second diode coupled to the second direct current voltage converter, wherein the second diode determines whether the second direct current voltage passes through the second diode; and
    an amplifier coupled to the first diode and the second diode, wherein the amplifier is configured to amplify the greater of the first direct current voltage and the second direct current voltage to drive a fan.

7. The computing system of claim 6, wherein the first direct current voltage passes through the first diode if the first direct current voltage is greater than the second direct current voltage.

8. The computing system of claim 6, wherein the second direct current voltage passes through the second diode if the second direct current voltage is greater than the first direct current voltage.

9. The computing system of claim 6, wherein a first voltage drop developed across the first diode is the same as a second voltage drop developed across the second diode.

10. The computing system of claim 6, wherein the first direct current voltage converter and the second direct current voltage converter are resistor-capacitor circuits.

* * * * *